United States Patent
Liu et al.

(10) Patent No.: US 11,191,035 B2
(45) Date of Patent: Nov. 30, 2021

(54) ELECTRONIC DEVICE, AND METHOD AND APPARATUS FOR RADIATION POWER ADJUSTMENT

(71) Applicant: Beijing Xiaomi Mobile Software Co., Ltd., Beijing (CN)

(72) Inventors: Yaqi Liu, Beijing (CN); Linchuan Wang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 16/927,368

(22) Filed: Jul. 13, 2020

(65) Prior Publication Data

US 2021/0250873 A1    Aug. 12, 2021

(30) Foreign Application Priority Data

Feb. 10, 2020 (CN) .......................... 202010085398.9

(51) Int. Cl.
*H04W 52/18* (2009.01)

(52) U.S. Cl.
CPC ................... *H04W 52/18* (2013.01)

(58) Field of Classification Search
CPC .................................................... H04W 52/18
USPC .................................................. 455/522, 69
See application file for complete search history.

(56) References Cited

U.S. PATENT DOCUMENTS

| | | | | |
|---|---|---|---|---|
| 7,043,988 B2 * | 5/2006 | Nozoe | ............... | G01C 19/5607 73/1.37 |
| 8,466,839 B2 * | 6/2013 | Schlub | ................... | H01Q 5/378 343/702 |
| 8,467,840 B2 * | 6/2013 | Lin | ........................ | H01Q 1/245 455/575.7 |
| 8,515,496 B2 * | 8/2013 | Cheng | .................... | H01Q 1/243 455/562.1 |
| 8,577,289 B2 * | 11/2013 | Schlub | ................. | H03K 17/955 455/41.1 |
| 8,644,778 B2 * | 2/2014 | Leukkunen | .......... | H04B 7/0691 455/117 |

(Continued)

FOREIGN PATENT DOCUMENTS

| | | |
|---|---|---|
| EP | 3087636 | 11/2016 |
| EP | 3176952 A1 | 6/2017 |

(Continued)

OTHER PUBLICATIONS

European Search Report in European Application No. 201880003.6 dated Jan. 26, 2021.

(Continued)

*Primary Examiner* — Hai V Nguyen
(74) *Attorney, Agent, or Firm* — Finnegan, Henderson, Farabow, Garrett & Dunner, L.L.P.

(57) ABSTRACT

An electronic device includes: a plurality of metal sensing members with sensing regions facing different directions; a test sensor, including a plurality of signal channels, wherein the plurality of signal channels are connected to the metal sensing members through signal wires, and the test sensor is configured to acquire a first capacitance variation when a distance between a sensing region and a user changes; and a processor connected to the test sensor, the processor being configured to adjust a radiation power of a radio frequency circuit in the electronic device according to the first capacitance variation.

17 Claims, 12 Drawing Sheets

(56) References Cited

U.S. PATENT DOCUMENTS

| | | | |
|---|---|---|---|
| 8,781,420 B2* | 7/2014 | Schlub | H04W 8/22 455/127.2 |
| 8,947,302 B2* | 2/2015 | Caballero | H01Q 9/0421 343/702 |
| 9,146,643 B2* | 9/2015 | Hong | G06F 3/04166 |
| 9,331,730 B2* | 5/2016 | Zhang | H04B 1/3838 |
| 9,413,410 B2* | 8/2016 | You | H04B 15/00 |
| 9,502,768 B2* | 11/2016 | Huang | H01Q 1/44 |
| 9,612,692 B2* | 4/2017 | Park | G06F 3/0446 |
| 9,621,211 B2* | 4/2017 | Shi | H04B 1/3838 |
| 9,621,222 B2* | 4/2017 | Shin | H04B 1/74 |
| 9,705,182 B2* | 7/2017 | Hsu | H01Q 1/52 |
| 9,854,540 B2* | 12/2017 | Sun | H04B 17/12 |
| 10,484,101 B2* | 11/2019 | Hashiguchi | H04B 5/02 |
| 2003/0013496 A1* | 1/2003 | Kim | H04M 19/04 455/567 |
| 2003/0064761 A1* | 4/2003 | Nevermann | H04B 1/3838 455/572 |
| 2006/0032311 A1* | 2/2006 | Nozoe | G01P 21/02 73/527 |
| 2012/0214422 A1 | 8/2012 | Shi et al. | |
| 2013/0127774 A1* | 5/2013 | Hong | G06F 3/0446 345/174 |
| 2013/0130633 A1* | 5/2013 | Lin | H01Q 1/245 455/127.1 |
| 2013/0265279 A1* | 10/2013 | Park | G06F 3/0445 345/174 |
| 2013/0293244 A1* | 11/2013 | Leek | G06F 3/044 324/630 |
| 2014/0155000 A1* | 6/2014 | Erkens | H04B 1/3833 455/73 |
| 2014/0323068 A1* | 10/2014 | Chang | H04B 1/3838 455/127.2 |
| 2015/0022403 A1 | 1/2015 | Lin | |
| 2015/0097740 A1* | 4/2015 | Sun | H04B 17/12 343/703 |
| 2015/0201385 A1* | 7/2015 | Mercer | H04B 17/318 455/452.1 |
| 2015/0222312 A1 | 8/2015 | Shi et al. | |
| 2015/0270619 A1 | 9/2015 | Zhu et al. | |
| 2016/0061983 A1* | 3/2016 | Heikura | H01Q 1/243 324/207.15 |
| 2016/0105854 A1 | 4/2016 | Lee | |
| 2017/0194996 A1 | 7/2017 | Shi et al. | |
| 2018/0351237 A1 | 12/2018 | Muhn | |
| 2019/0328230 A1* | 10/2019 | Schumacher | A61B 5/0031 |

FOREIGN PATENT DOCUMENTS

| | | |
|---|---|---|
| EP | 3379644 A1 | 9/2018 |
| JP | 2008-504740 A | 2/2008 |
| JP | 2014-82735 A | 5/2014 |
| JP | 2014-511053 A | 5/2014 |
| JP | 2016-38220 A | 3/2016 |
| KR | 20170019838 A | 2/2017 |
| KR | 20190027865 A | 3/2019 |
| KR | 20190033943 A | 4/2019 |

OTHER PUBLICATIONS

Notice of Reasons for Refusal dated Sep. 28, 2021, from Japanese Patent Office in counterpart Japanese Application No. 2020-123683.

* cited by examiner

ELECTRONIC DEVICE, AND METHOD AND APPARATUS FOR RADIATION POWER ADJUSTMENT

CROSS-REFERENCE TO RELATED APPLICATION

This application is based upon and claims priority to Chinese Patent Application No. 202010085398.9, filed on Feb. 10, 2020, the entire contents of which are incorporated herein by reference.

TECHNICAL FIELD

The present disclosure relates to the technical field of terminals, and more particularly, to an electronic device, and a method and apparatus for radiation power adjustment.

BACKGROUND

A specific absorption rate refers to electromagnetic energy absorbed by a human body under the action of a mobile phone or other wireless electronic devices. As the specific absorption rate is lower, the human body absorbs less radiation. For protecting the health of users, the standard of the specific absorption rate has been made in the world.

With the communication functions of electronic devices becoming powerful and data communication being updated, electronic devices may be provided with more radiating antennas, and the radiation directions of the radiating antennas may increase accordingly. Therefore, there is a need to detect a distance variation between a user and an electronic device in all directions to adjust a radiation power, so as to adjust the specific absorption rate.

SUMMARY

According to a first aspect of embodiments of the present disclosure, an electronic device may include: a plurality of metal sensing members with sensing regions facing different directions; a test sensor including a plurality of signal channels, wherein the plurality of signal channels are connected to the metal sensing members through signal wires, and the test sensor is configured to acquire a first capacitance variation when a distance between a sensing region and a user changes; and a processor connected to the test sensor, the processor being configured to adjust a radiation power of a radio frequency circuit in the electronic device according to the first capacitance variation.

According to a second aspect of the embodiments of the present disclosure, a method for radiation power adjustment is applied to an electronic device. The method may be used to adjust a radiation power of a radio frequency circuit in the electronic device, and may include: receiving data of at least one signal channel from a test sensor of the electronic device, wherein the data of each of the at least one signal channel includes a first capacitance variation and first identification information; determining a radio frequency circuit to be adjusted according to the first identification information, wherein a radiation direction of the radio frequency circuit is the same as an orientation of a sensing region corresponding to the first capacitance variation; and adjusting a radiation power of the radio frequency circuit according to the first capacitance variation.

According to a third aspect of the embodiments of the present disclosure, an electronic device includes a processor and a memory configured to store instructions executable by the processor. The processor may be configured to: receive data of at least one signal channel from a test sensor of the electronic device, wherein the data of each of the at least one signal channel includes a first capacitance variation and first identification information; determine a radio frequency circuit to be adjusted according to the first identification information, a radiation direction of the radio frequency circuit being the same as an orientation of a sensing region corresponding to the first capacitance variation; and adjust a radiation power of the radio frequency circuit according to the first capacitance variation.

It is to be understood that the above general description and detailed description below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are for describing exemplary embodiments only, and are not intended to limit the present disclosure. For example, although the terms "first," "second," "third," etc. may be used to describe various information in the present disclosure, the information should not be limited to these terms. The terms are only used to distinguish the same type of information from each other. For example, without departing from the scope of the present disclosure, first information may also be referred to as second information, and similarly, second information may also be referred to as first information.

Figure 1:
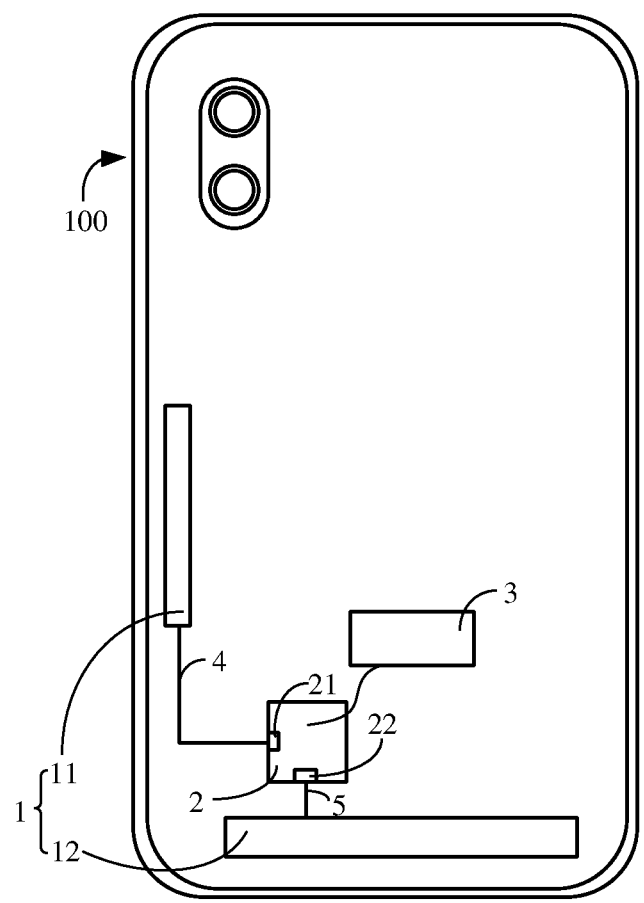
FIG. 1 is a schematic diagram of an electronic device according to an exemplary embodiment.

FIG. 1 is a schematic diagram of an electronic device 100 according to an exemplary embodiment. As shown in FIG. 1, the electronic device 100 may include a plurality of metal sensing members 1, a test sensor 2, and a processor 3. Sensing regions of the plurality of metal sensing members 1 may be oriented in different directions. For example, the sensing regions may be parallel to a surface of the electronic device 100. For example, as shown in FIG. 1, the plurality of metal sensing members 1 may include a first metal sensing member 11 and a second metal sensing member 12. The sensing region of the first metal sensing member 11 may be oriented toward a left surface of the electronic device 100. The sensing region of the second metal sensing member 12 may be oriented toward a back surface of the electronic device 100. The test sensor 2 may include a plurality of signal channels connected to the metal sensing members 1 through signal wires. In this way, when a user approaches or moves away from a sensing region, a capacitance between the user and the sensing region may changes, the test sensor 2 may be configured to acquire a first capacitance variation when a distance between the sensing region and the user changes, and the processor 3 may be connected to the test sensor 2, so that the processor 3 may adjust a radiation power of a radio frequency circuit in the electronic device 100 according to the received first capacitance variation, thereby adjusting a specific absorption rate of the electronic device 100. For example, the processor 3 may adjust the radiation power of the radio frequency circuit having a radiation direction perpendicular to the sensing region, so as to reduce the adjusted specific absorption rate of the electronic device while avoiding affecting the normal function of the radio frequency circuit as much as possible.

In an embodiment, as shown in FIG. 1, the test sensor 2 may include a first signal channel 21 and a second signal channel 22. The first signal channel 21 may be connected to the first metal sensing member 11 through a signal wire 4. The second signal channel 22 may be connected to the second metal sensing member 12 through a signal wire 5. When a user gradually approaches the electronic device 100 from the left side surface of the electronic device 100, the test sensor 2 can detect a first capacitance variation, and may determine that the distance between the user and the electronic device 100 is short at this moment according to the first capacitance variation, so that the processor 3 may reduce the radiation power of the radio frequency circuit in the electronic device 100, thereby reducing the specific absorption rate of the electronic device 100 to make it meet design requirements. Similarly, when the user gradually approaches the electronic device 100 from the back side surface of the electronic device 100, the test sensor 2 may acquire a first capacitance variation through the second signal channel, and the processor 3 may reduce the radiation power of the radio frequency circuit toward the back side surface of the electronic device 100 according to the first capacitance variation, so as to reduce the specific absorption rate.

In the above embodiments, sensing regions can be formed in multiple directions by a plurality of metal sensing members, so that it can be detected whether a user is approaching an electronic device in multiple directions, so as to adjust a specific absorption rate. Multi-directional detection can improve the accuracy of detection and is favorable for reducing the radiation impact of electronic devices on users.

In an embodiment, the metal sensing member 1 may be a metal member dedicated for detecting a distance between a user and the electronic device 100. In another embodiment, in order to reduce costs and save the internal space of the electronic device 100, the metal sensing member 1 may also be an antenna radiation unit or a metal middle frame, or may be other metal elements in the electronic device 100, which is not limited in the present disclosure. The antenna radiation unit may include a laser shaped antenna.

In an embodiment, when the antenna radiation unit is adopted for both antenna radiation and capacitance detection, the antenna radiation unit may be connected to a signal channel of the test sensor 2 through a signal wire. When the antenna radiation unit is formed on the metal middle frame of the electronic device 100, in order to prevent the metal middle frame from affecting or shielding a capacitance variation between the antenna radiation unit and a user, a projection of the metal middle frame may not overlap with a projection of a sensing region of the antenna radiation unit in a direction perpendicular to the sensing region of the antenna radiation unit.

Figure 2:
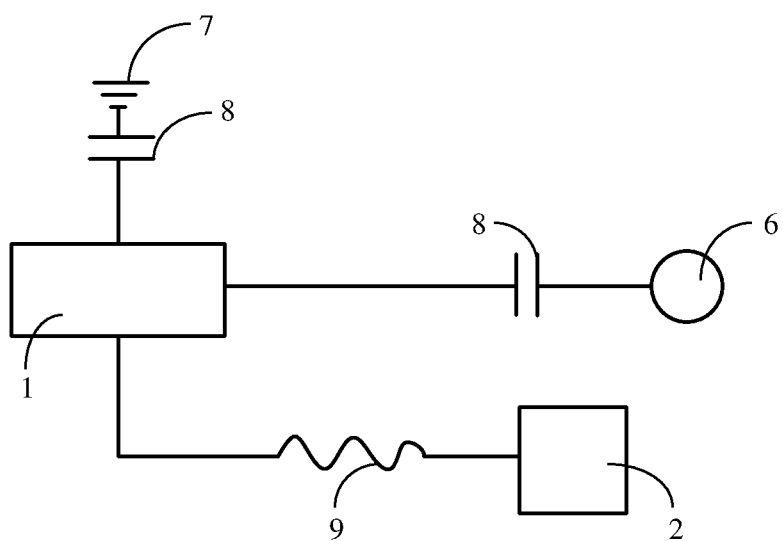
FIG. 2 is a schematic diagram of a connection circuit between an antenna radiation unit and a test sensor according to an exemplary embodiment.

In an embodiment, to ensure that the antenna radiation unit can simultaneously realize antenna absorption radiation while forming a capacitive coupler with a user, a first capacitor may also be added to a circuit related to the antenna radiation unit. For example, as shown in FIG. 2, the electronic device 100 may further include an antenna feed spring 6, an antenna ground spring 7, and a plurality of first capacitors 8 related to the antenna radiation unit. The antenna feed spring 6 and the antenna ground spring 7 may be each connected with a first capacitor 8 in series to isolate a direct current through the first capacitor 8 to ensure the normal operation of the test sensor 2. In an embodiment, to ensure the normal operation of an antenna structure of the electronic device 100, a capacitance value of the first capacitor 8 may be greater than or equal to 33 pF. In addition to electronic elements in the circuit shown in FIG. 2, there may be other electronic elements related to the antenna radiation unit, for example, an inductor or a resistor.

In some embodiments, the electronic device 100 may further include a first inductor 9. The first inductor 9 is arranged between and connected with the signal channel of the test sensor 2 and the antenna radiation unit. The impact of the test sensor 2 on the antenna performance can be reduced as much as possible under the shielding action of the inductor.

Figure 3:
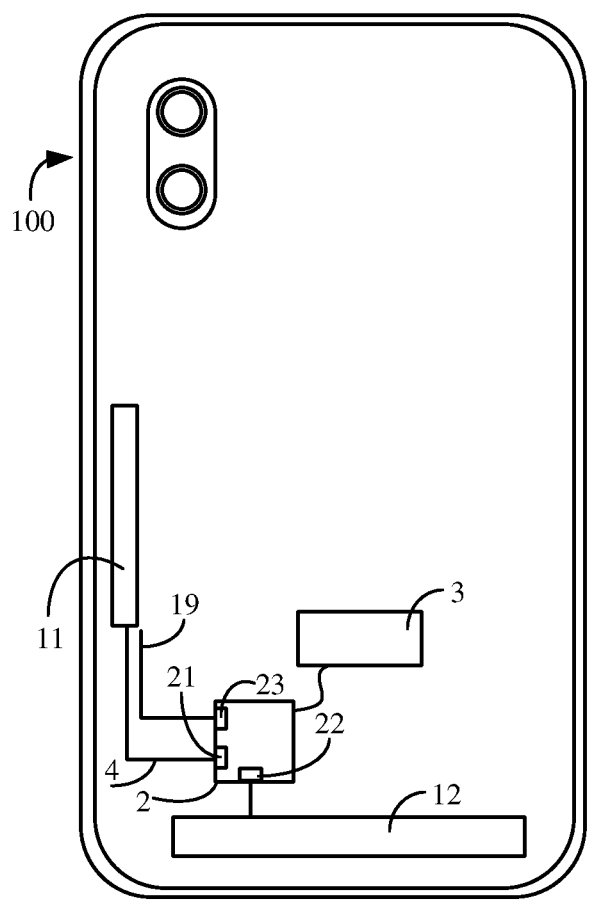
FIG. 3 is a schematic diagram of an electronic device according to an exemplary embodiment.

In some embodiments, when the distance between the metal sensing member 1 and the corresponding signal channel is long, such as the metal sensing member shown in FIG. 3, the test sensor 2 may further include at least one reference channel. Each reference channel may be led out to any one of the metal sensing members through a reference wire, and a reference wire 19 extending toward the same metal sensing member 1 may be parallel to the signal wire, so that an interference signal transmitted via the signal wire can be acquired through the reference wire 19. Noise in the signal received by the signal channel can be filtered by difference calculation.

For example, as shown in FIG. 3, the test sensor 2 may include a reference channel 23. The reference channel 23 may extend toward the first metal sensing member 11 through the reference wire 19. The first metal sensing member 11 is also connected to the signal channel 21 of the test sensor 2 through the signal wire 4. As shown in FIG. 3, the extension directions of the reference wire 19 and the signal wire 4 are substantially the same, so that a differential circuit can be formed to shield noise interference.

Figure 4:
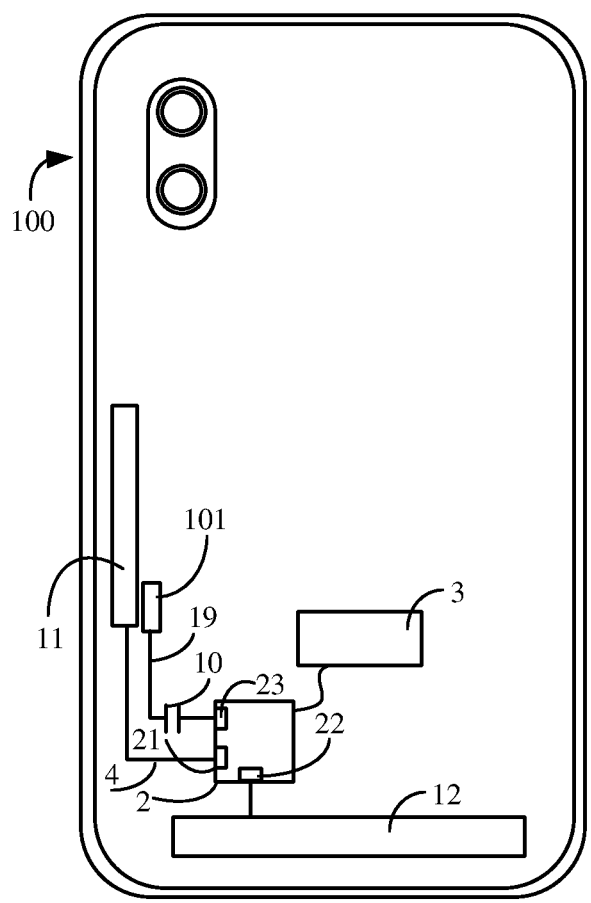
FIG. 4 is a schematic diagram of an electronic device according to an exemplary embodiment.

Further, as shown in FIG. 4, the electronic device 100 may further include a second capacitor 10. The second capacitor 10 may be connected to the corresponding reference channel through the reference wire. A difference between a capacitance value of the second capacitor 10 and a capacitance value of a parallel related capacitor of the signal wire is within a preset range, and a temperature drift characteristic of the second capacitor 10 is the same as a temperature drift characteristic of the related capacitor of the parallel signal wire. For example, as shown in FIG. 4, the second capacitor 10 may be connected to the reference channel 23 through the reference wire 19. The difference between the capacitance value of the second capacitor 10 connected to the reference wire 19 and the capacitance value of a related capacitor of the signal wire 4 is within a preset range, and the temperature drift characteristic of the second capacitor 10 connected to the reference wire 19 is the same as the temperature drift characteristic of the related capacitor of the parallel signal wire 4. The preset range may be within 1 pF or within 2 pF, which is not limited in the present disclosure. The related capacitor of the parallel signal wire 4 may include a first capacitor 8 (FIG. 2) or may also include other capacitors in the circuit of the first metal sensing member 11 connected to the signal wire 4.

In an embodiment, as shown in FIG. 4, the electronic device 100 may further include a reference sensing member 101. The reference sensing member 101 may be connected to the reference channel of the test sensor 2 via the reference wire 19. A distance between the reference sensing member 101 and the metal sensing member 1 may be less than a preset distance, and the reference sensing member 101 may be disposed in the vicinity of the metal sensing member 1. For example, as still shown in FIG. 4, the reference sensing member 101 may be connected to the reference channel 23 of the test sensor 2 through the reference wire 19, so that the processor 3 may be configured to acquire, through the reference channel 23, a second capacitance variation when a distance between the sensing region of the first metal sensing member 11 and a user changes, and correct noise carried in the first capacitance variation according to the second capacitance variation.

Figure 5:
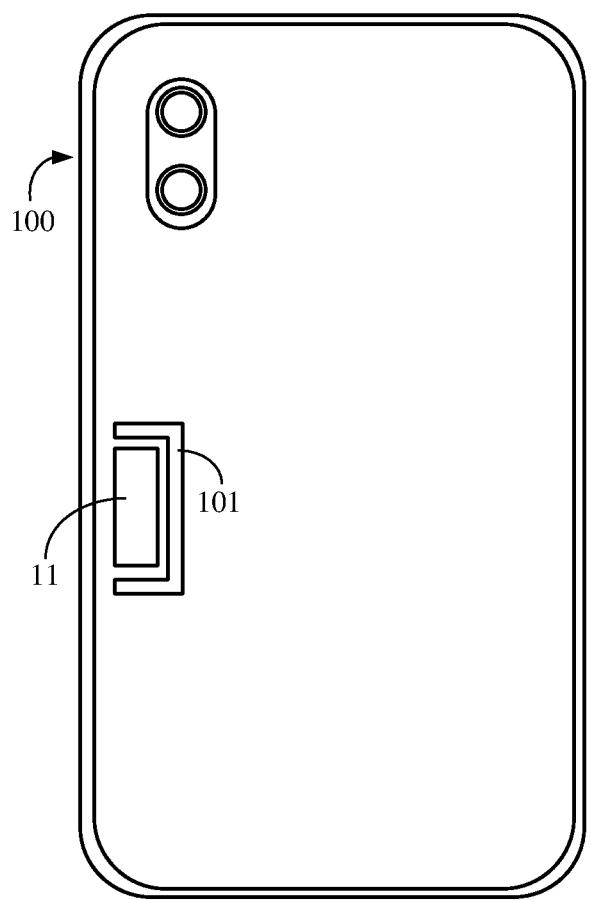
FIG. 5 is a schematic diagram of an electronic device according to an exemplary embodiment.

For example, as shown in FIG. 5, the sensing region of the first metal sensing member 11 may face a left surface of the electronic device 100. Since the first metal sensing member 11 is a three-dimensional object, there can be a part of the surface parallel to the back surface of the electronic device 100. Therefore, the reference sensing member 101 may be disposed near the first metal sensing member 11, and a region of the reference sensing member 101 facing the left surface of the electronic device 100 may be shielded, that is, when a distance between a user and the region changes, the test sensor 2 may not detect the second capacitance variation, while, when a distance between the region of the reference sensing member 101 facing the electronic device 100 and the user changes, the test sensor 2 may detect the second capacitance variation. Based on a preset function relationship between the second capacitance variation and the first capacitance variation, the first capacitance variation generated by a distance variation, caused by accidental back touch, between the metal sensing member 11 facing the back surface of the electronic device 100 and a user can be corrected to ensure that the metal sensing member 11 is only used to detect the distance between the left surface of the electronic device 100 and the user.

In the above embodiments, the test sensor 2 may include a first signal channel 21 and a second signal channel 22. As shown in FIG. 1, the first signal channel 21 may be connected to a first metal sensing member 11 through the signal wire 4, and the second signal channel 22 may be connected to a second metal sensing member 12 through the signal wire 5. In other embodiments, the first signal channel 21 may also be connected to two or more first metal sensing members 11 through other signal wires. Similarly, the second signal channel 22 may also be connected to other two or more second metal sensing members 12 through other signal wires, which is not limited in the present disclosure.

In an embodiment, orientations of sensing regions of the plurality of first metal sensing members 11 may be the same or different, and orientations of sensing regions of the plurality of second metal sensing members 12 may also be the same or different. Meanwhile, an orientation of a sensing region of the second metal sensing member 12 may be different from an orientations of a sensing regions of the first metal sensing member 11. In this way, it can be ensured that the electronic device 100 can detect a distance from a user in at least two directions.

For example, it is assumed that the sensing region of the first metal sensing member 11 faces a side surface of the electronic device 100 and the sensing region of the second metal sensing member 12 faces front and back surfaces of the electronic device 100, a first capacitance variation $\Delta C1$ may be detected by the first signal channel 21, and a second capacitance variation $\Delta C2$ may be detected by the second signal channel 22. Then, after receiving the first capacitance variations $\Delta C1$ and $\Delta C2$ from the test sensor 2, the processor 3 may compare $\Delta C1$ and $\Delta C2$ with a threshold respectively. When $\Delta C1$ or $\Delta C2$ is respectively greater than the threshold, the processor 3 may adjust the radiation power of the radio frequency circuit in the electronic device 100 that transmits a radiation signal to the sensing region. For example, the radiation power of the radio frequency circuit can be reduced, thereby reducing the specific absorption rate of the electronic device 100.

In another embodiment, each of the first metal sensing members 11 is an antenna radiation unit, and a radiation direction of the antenna radiation unit is perpendicular to a sensing region of the antenna radiation unit. Then, it can be understood that when the antenna radiation unit is not in a working state, the side surface corresponding to the sensing region of the antenna radiation unit may not radiate a radiation signal harmful to a user, so the processor 3 may not be concerned in the capacitance variation corresponding to the antenna radiation unit in this state. When the antenna radiation unit is in a working state, the processor 3 may determine a distance variation between the sensing region of the antenna radiation unit and the user according to the first capacitance variation corresponding to the antenna radiation unit to determine whether it is needed to adjust the radiation power of the antenna radiation unit.

In an embodiment, the processor 3 may also be configured to acquire a distance between a user and the electronic device 100 in a direction perpendicular to a corresponding sensing region according to the first capacitance variation. For example, a mapping relationship between a distance and a capacitance variation range may be pre-stored in the electronic device 100. For example, when the first capacitance variation received by the processor 3 is within a first preset range, it may be determined that the distance between the user and the electronic device 100 at this moment is within a first distance range. When the first capacitance variation received by the processor 3 is within a second preset range, it may be determined that the distance between the user and the electronic device 100 at this moment is within a second distance range, and so on, which can realize multiple detections of the distance between the user and the electronic device 100, reduce number of specially configured distance sensors, and reduce the production cost.

Figure 6:
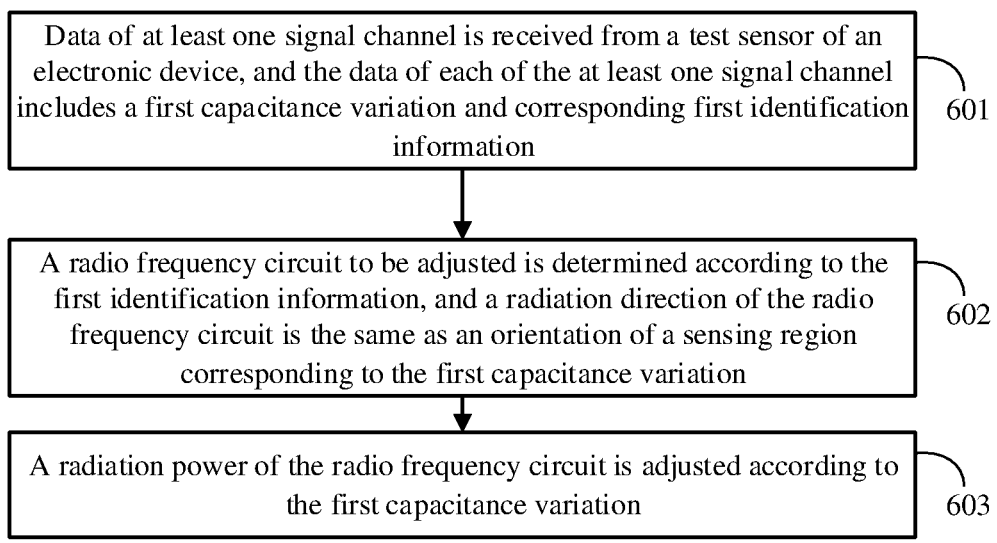
FIG. 6 is a flowchart of a radiation power adjustment method according to an exemplary embodiment.

FIG. 6 is a flowchart of a radiation power adjustment method according to an exemplary embodiment. The method is applied to an electronic device, and may be used to adjust a radiation power of a radio frequency circuit in the electronic device, and further to adjust a specific absorption rate of the electronic device by adjusting the radiation power. As shown in FIG. 6, the method may include the following operations.

In operation 601, data of at least one signal channel is received from a test sensor of the electronic device. The data of each of the at least one signal channel may include a first capacitance variation and corresponding first identification information.

In the embodiment, the test sensor may include a plurality of signal channels. Each signal channel may be connected to a metal sensing member through a signal wire. The metal sensing member may include a sensing region, and capacitance coupling may be formed between the sensing region and a user. When a distance between the user and the sensing region changes, a capacitance variation that can be detected by the test sensor changes accordingly. The electronic device may include a plurality of metal sensing members, which include at least two metal sensing members with sensing regions in different orientations. The signal channel may be identified by the first identification information, so as to determine a sensing region corresponding to the first capacitance variation and determine the radio frequency circuit to be adjusted in radiation power.

In operation 602, a radio frequency circuit to be adjusted is determined according to the first identification information. A radiation direction of the radio frequency circuit is the same as an orientation of a sensing region corresponding to the first capacitance variation.

In the embodiment, the radio frequency circuit to be adjusted may be determined according to the first identification information. For example, it is assumed that the test sensor may include a first signal channel identified as "1" and a second signal channel identified as "2". The sensing region of the metal sensing member connected to the first signal channel faces a first surface of the electronic device, and the sensing region of the metal sensing member connected to the second signal channel faces a second surface of the electronic device. Further, a radio frequency direction of each radio frequency circuit may be pre-stored in the electronic device. When data of the signal channel with the first identification information being "1" is received, the radiation power of the radio frequency circuit with the radio frequency direction facing the first surface may be adjusted according to the first capacitance variation. When data of the signal channel with the first identification information being "2" is received, the radiation power of the radio frequency circuit with the radio frequency direction facing the second surface may be adjusted according to the first capacitance variation.

In operation 603, a radiation power of the radio frequency circuit is adjusted according to the first capacitance variation.

In the embodiment, when a distance between a user and the electronic device is increased according to the first capacitance variation, the radiation power of the radio frequency circuit may be reduced; or, when the distance between the user and the electronic device is reduced, the radiation power of the radio frequency circuit may be improved to ensure the communication function of the electronic device.

In an embodiment, it may be judged whether the first capacitance variation exceeds a threshold, and the radiation power of the corresponding radio frequency circuit may be reduced when the first capacitance variation exceeds the threshold. The threshold may be within the range of 0.8 pF-1 pF, which is not limited in the present disclosure.

In another embodiment, a threshold range of the first capacitance variation may be determined, and then the radiation power of the radio frequency circuit may be adjusted according to a mapping relationship between the threshold range and the radiation power. For example, the mapping relationship between the threshold range and the radiation power may be that: a radiation power corresponding to a first threshold range is T1, a radiation power corresponding to a second threshold range is T2, and a radiation power corresponding to a third threshold range is T3. Then, when it is determined that the first capacitance variation is within the second threshold range, the radiation power of the radio frequency circuit may be adjusted to T2; and when the first capacitance variation is within the first threshold range, the radiation power of the radio frequency circuit may be adjusted to T1. In this period, the radiation power of the radio frequency circuit may be increased or decreased to achieve a balance between the specific absorption rate and the antenna performance as much as possible.

In the above embodiments, data of a reference channel may also be received from the test sensor. The data of the reference channel may include a second capacitance variation and second identification information. Data of a signal channel to be corrected may be determined according to the second identification information, and the corresponding first capacitance variation may be corrected according to the second capacitance variation. Specifically, the test sensor may include a plurality of reference channels, and each reference channel may be led out to a corresponding metal sensing member through the reference wire, and the reference wire and the signal wire leading to the same metal sensing are parallel to form a differential circuit.

The second identification information may be used to determine a metal sensing member leading to the reference channel, so that the first capacitance variation corresponding to the metal sensing member acquired by the signal channel may be corrected according to the second capacitance variation. The first capacitance variation may be corrected according to a preset function relationship.

In an embodiment, a distance between a user and a side surface parallel to the sensing region of the electronic device corresponding to the first capacitance variation may also be determined according to the first capacitance variation. For example, when the sensing region corresponding to the first capacitance variation faces a first surface of the electronic device, the first capacitance variation may be used to determine a distance between the user and the first surface, which is convenient for the electronic device to perform corresponding functional operations such as screen off and screen on according to the determined distance. The correspondence between a capacitance variation threshold and a preset distance may be stored and set in advance. For example, when the first capacitance variation is within a fourth threshold range, the preset distance may be less than or equal to L1; when the first capacitance variation is within a fifth threshold range, the preset distance may be greater than L1 and less than or equal to L2; and when the first capacitance variation is within a sixth threshold range, the preset distance may be greater than L2. The correspondence between the first capacitance variation corresponding to each signal channel and the preset distance may be the same or different, which is not limited in the present disclosure.

Corresponding to the foregoing embodiments of the radiation power adjustment method, the present disclosure also provides an embodiment of a radiation power adjustment apparatus.

Figure 7:
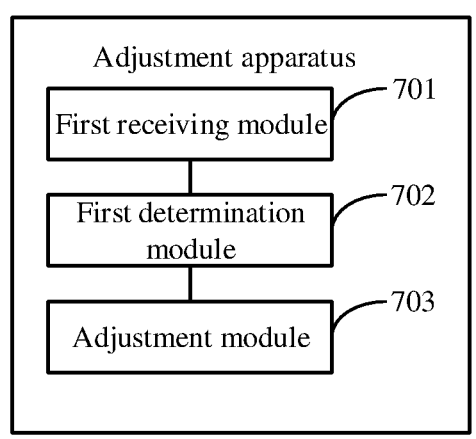
FIG. 7 is a block diagram of a radiation power adjustment apparatus according to an exemplary embodiment.

FIG. 7 is a block diagram of a radiation power adjustment apparatus according to an exemplary embodiment. The apparatus is applied to an electronic device. The adjustment apparatus is configured to adjust a radiation power of a radio frequency circuit in the electronic device. Referring to FIG. 7, the apparatus includes a first receiving module 701, a first determination module 702, and an adjustment module 703.

The first receiving module 701 is configured to receive data of at least one signal channel from a test sensor of the electronic device. The data of each of the at least one signal channel may include a first capacitance variation and corresponding first identification information.

The first determination module 702 is configured to determine a radio frequency circuit to be adjusted according to the first identification information. A radiation direction of the radio frequency circuit may be the same as an orientation of a sensing region corresponding to the first capacitance variation.

The adjustment module 703 is configured to adjust a radiation power of the radio frequency circuit according to the first capacitance variation.

Figure 8:
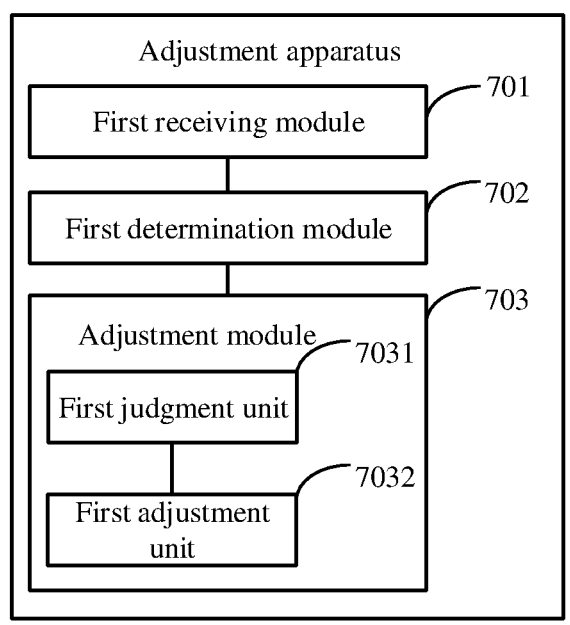
FIG. 8 is a block diagram of a radiation power adjustment apparatus according to an exemplary embodiment.

FIG. 8 is a block diagram of a radiation power adjustment apparatus according to an exemplary embodiment. This embodiment is based on the foregoing embodiment shown in FIG. 7. The adjustment module 703 may include a first judgment unit 7031 and a first adjustment unit 7032.

The first judgment unit 7031 is configured to judge whether the first capacitance variation exceeds a threshold.

The first adjustment unit 7032 is configured to reduce the radiation power of the radio frequency circuit when the first capacitance variation exceeds the threshold.

Figure 9:
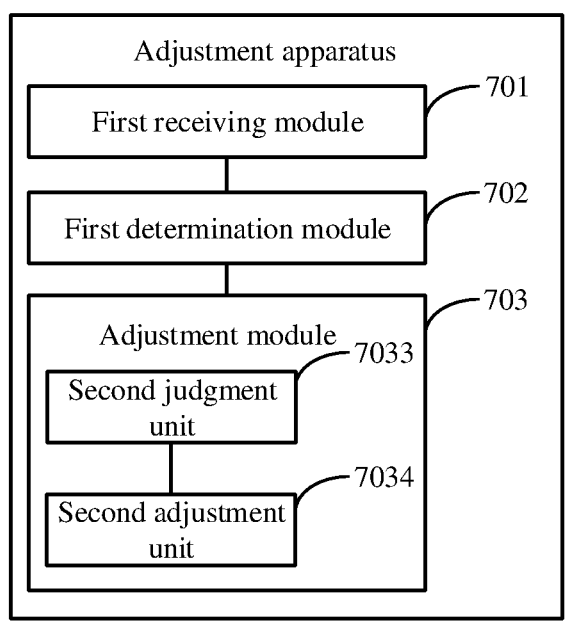
FIG. 9 is a block diagram of a radiation power adjustment apparatus according to an exemplary embodiment.

FIG. 9 is a block diagram of a radiation power adjustment apparatus according to an exemplary embodiment. This embodiment is based on the foregoing embodiment shown in FIG. 7. The adjustment module 703 may include a second judgment unit 7033 and a second adjustment unit 7034.

The second judgment unit 7033 is configured to judge a threshold range of the first capacitance variation.

The second adjustment unit 7034 is configured to adjust the radiation power of the radio frequency circuit according to a mapping relationship between the threshold range and the radiation power.

Figure 10:
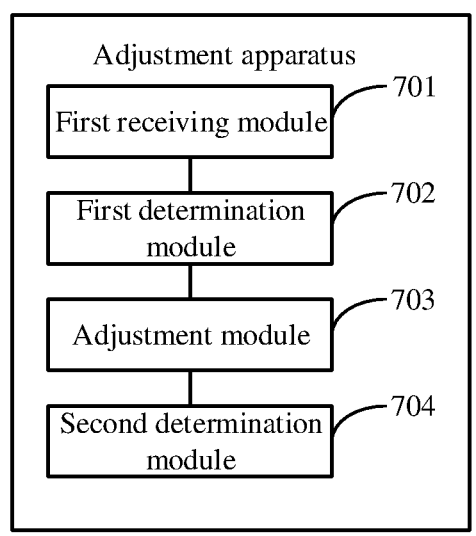
FIG. 10 is a block diagram of a radiation power adjustment apparatus according to an exemplary embodiment.

FIG. 10 is a block diagram of a radiation power adjustment apparatus according to an exemplary embodiment. This embodiment is based on the foregoing embodiment shown in FIG. 7. The apparatus may further include a second determination module 704.

The second determination module 704 is configured to determine a distance between a user and a side surface parallel to the sensing region of the electronic device corresponding to the first capacitance variation according to the first capacitance variation.

It is to be noted that the second determination module 704 in the apparatus embodiment shown in FIG. 10 may also be included in the apparatus embodiment in FIG. 8 or FIG. 9, which is not limited in the present disclosure.

Figure 11:
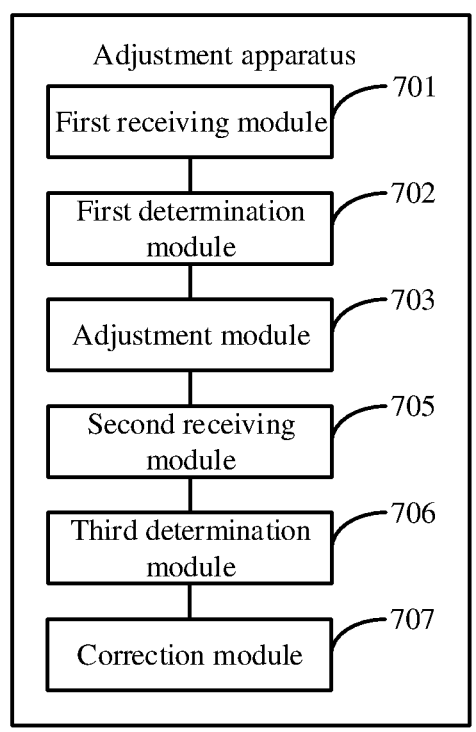
FIG. 11 is a block diagram of a radiation power adjustment apparatus according to an exemplary embodiment.

FIG. 11 is a block diagram of a radiation power adjustment apparatus according to an exemplary embodiment. This embodiment is based on the foregoing embodiment shown in FIG. 7. The apparatus may further include a second receiving module 705, a third determination module 706, and a correction module 707.

The second receiving module 705 is configured to receive data of a reference channel from the test sensor. The data of the reference channel may include a second capacitance variation and second identification information.

The third determination module 706 is configured to determine data of a signal channel to be corrected according to the second identification information.

The correction module 707 is configured to correct the first capacitance variation in the data of the signal channel according to the second capacitance variation.

It is to be noted that the second receiving module 705, the third determination module 706, and the correction module 707 in the apparatus embodiment shown in FIG. 11 may also be included in the apparatus embodiment in any one of FIG. 8 to FIG. 10, which is not limited in the present disclosure.

With regard to the apparatus in the above embodiments, the specific manner in which the respective modules perform the operations has been described in detail in the method embodiments, and will not be repeated herein.

The apparatus embodiments described above are merely exemplary. The modules/units described as separate components may be or may not be physically separated, and the components displayed as modules/units may be located in one place or distributed to multiple networks. Some or all of the modules/units may be selected according to actual needs.

The present disclosure also provides a radiation power adjustment apparatus for adjusting a radiation power of a radio frequency circuit in the electronic device. The apparatus includes: a processor; and a memory for storing instructions executable by the processor. The processor is configured to: receive data of at least one signal channel from a test sensor of the electronic device, the data of each of the at least one signal channel including a first capacitance variation and corresponding first identification information; determine a radio frequency circuit to be adjusted according to the first identification information, a radiation direction of the radio frequency circuit being the same as an orientation of a sensing region corresponding to the first capacitance variation; and adjust a radiation power of the radio frequency circuit according to the first capacitance variation.

Figure 12:
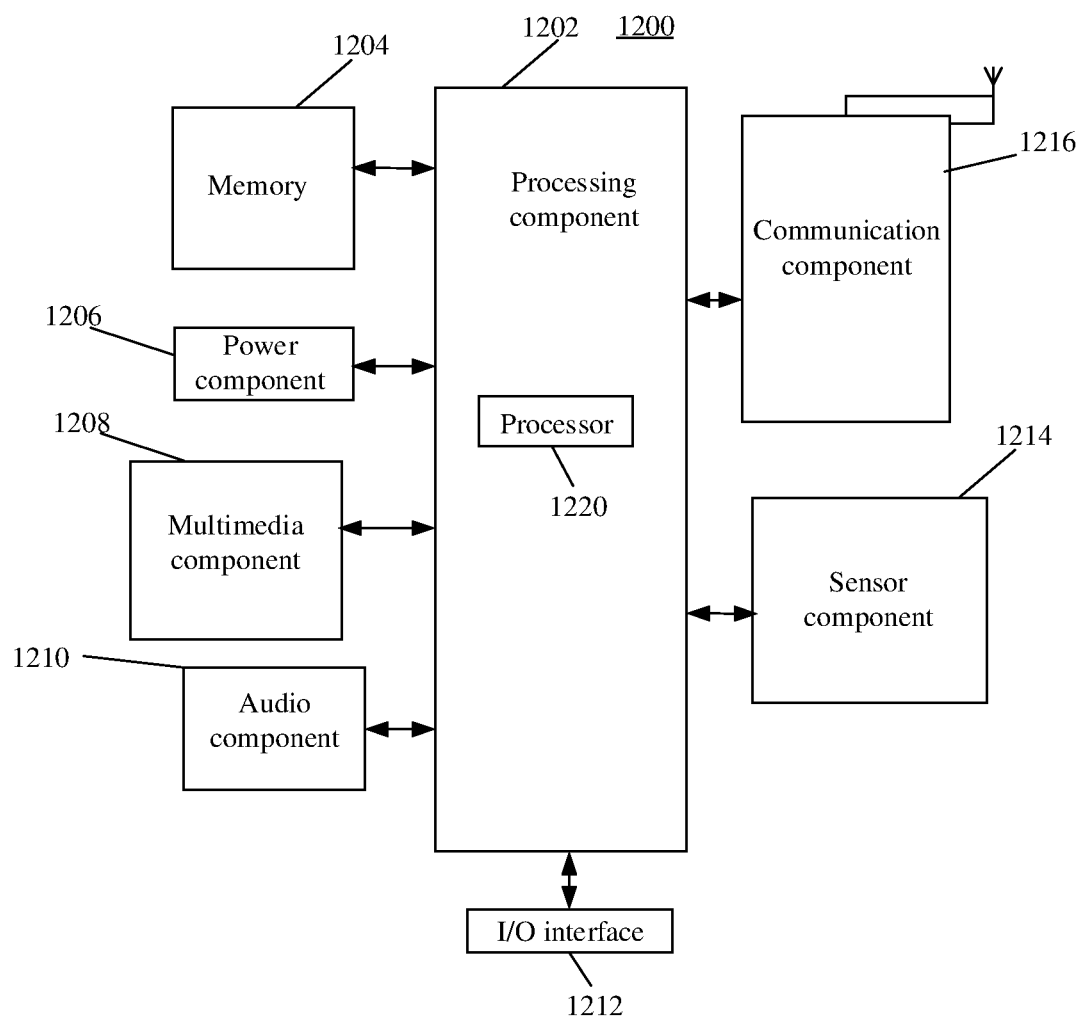
FIG. 12 is a block diagram of an apparatus for adjusting a radiation power according to an exemplary embodiment.

FIG. 12 is a block diagram of an apparatus 1200 for adjusting a radiation power according to an exemplary embodiment. For example, the apparatus 1200 may be a mobile phone, a computer, a digital broadcast terminal, a messaging device, a gaming console, a tablet, a medical device, exercise equipment, a personal digital assistant, and the like.

Referring to FIG. 12, the apparatus 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the apparatus 1200, such as the operations associated with display, telephone calls, data communications, camera operations, and recording operations. The processing component 1202 may include one or more processors 1220 to execute instructions to perform all or part of the operations in the above described methods. Moreover, the processing component 1202 may include one or more modules which facilitate the interaction between the processing component 1202 and other components. For example, the processing component 1202 may include a multimedia module to facilitate the interaction between the multimedia component 1208 and the processing component 1202.

The memory 1204 is configured to store various types of data to support the operation of the apparatus 1200. Examples of such data include instructions for any applications or methods operated on the apparatus 1200, contact data, phonebook data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 may provide power to various components of the apparatus 1200. The power component 1206 may include a power management system, one or more power sources, and any other components associated with the generation, management, and distribution of power in the apparatus 1200.

The multimedia component 1208 may include a screen providing an output interface between the apparatus 1200 and the user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1208 includes a front camera and/or a rear camera. The front camera and the rear camera may receive an external multimedia datum while the apparatus 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone (MIC) configured to receive an external audio signal when the apparatus 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 may provide an interface between the processing component 1202 and peripheral interface modules, such as a keyboard, a click wheel, buttons, and the like. The buttons may include, but are not limited to, a home button, a volume button, a starting button, and a locking button.

The sensor component 1214 may include one or more sensors to provide status assessments of various aspects of the apparatus 1200. For example, the sensor component 1214 may detect an open/closed status of the apparatus 1200, relative positioning of components, e.g., the display and the keypad, of the apparatus 1200, a change in position of the apparatus 1200 or a component of the apparatus 1200, a presence or absence of user contact with the apparatus 1200, an orientation or an acceleration/deceleration of the apparatus 1200, and a change in temperature of the apparatus 1200. The sensor component 1214 may include a proximity sensor configured to detect presence of an object nearby without any physical contact. The sensor component 1214 may also include a light sensor, such as a complementary metal oxide semiconductor (CMOS) or charge coupled device (CCD) image sensor, configured for use in an imaging application. In some embodiments, the sensor component 1214 may also include an acceleration sensor, a gyroscope sensor, a magnetic sensor, a pressure sensor or a temperature sensor.

The communication component 1216 is configured to facilitate communication, wired or wirelessly, between the apparatus 1200 and other devices. The apparatus 1200 may access a wireless network based on a communication standard, such as WiFi, 2G or 3G, 4G LTE, 5G NR, or a combination thereof. In one exemplary embodiment, the communication component 1216 receives a broadcast signal or broadcast associated information from an external broadcast management system via a broadcast channel In one exemplary embodiment, the communication component 1216 further includes an NFC module to facilitate short-range communications. In one exemplary embodiment, the communication component 1216 may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 1204, executable by the processor 1220 in the apparatus 1200, for performing the above-described methods. For example, the non-transitory computer-readable storage medium may be a ROM, a random access memory (RAM), a CD-ROM, a magnetic tape, a floppy disc, an optical data storage device and the like.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. An electronic device, comprising:
   a plurality of metal sensing members with sensing regions facing different directions;

a test sensor comprising a plurality of signal channels, wherein the plurality of signal channels are connected to the metal sensing members through signal wires, and the test sensor is configured to acquire a first capacitance variation when a distance between a sensing region and a user changes; and a processor connected to the test sensor, the processor being configured to adjust a radiation power of a radio frequency circuit in the electronic device according to the first capacitance variation, wherein the test sensor further comprises a reference channel;

the reference channel is connected to a metal sensing member of the metal sensing members through a reference wire; and the reference wire is parallel to a signal wire connected to the metal sensing member, to correct noise in a signal transmitted by the signal wire according to a signal transmitted by the reference wire.

2. The electronic device according to claim 1, wherein the metal sensing member comprises one of an antenna radiation unit or a metal middle frame.

3. The electronic device according to claim 2, wherein when the metal sensing member comprises the antenna radiation unit, the antenna radiation unit is connected to a signal channel of the test sensor through the signal wire; and the electronic device further comprises a metal middle frame, and a projection of the metal middle frame does not overlap a projection of a sensing region of the antenna radiation unit in a direction perpendicular to the sensing region of the antenna radiation unit.

4. The electronic device according to claim 2, wherein when the metal sensing member comprises the antenna radiation unit, the electronic device further comprises an antenna feed spring, an antenna ground spring, and a plurality of first capacitors, wherein the antenna feed spring and the antenna ground spring are respectively connected with the plurality of first capacitors in series.

5. The electronic device according to claim 4, wherein a capacitance value of a first capacitor of the plurality of first capacitors is greater than or equal to 33 pF.

6. The electronic device according to claim 4, further comprising:

a first inductor, arranged between and connected with a signal channel of the test sensor and the antenna radiation unit.

7. The electronic device according to claim 1, further comprising:

a second capacitor, connected to the reference channel through the reference wire, wherein a difference between a capacitance value of the second capacitor and a capacitance value of a related capacitor of the signal wire is within a preset range, and a temperature drift characteristic of the second capacitor is the same as a temperature drift characteristic of the related capacitor of the signal wire.

8. The electronic device according to claim 1, further comprising:

a reference sensing member, connected to the reference channel through the reference wire, wherein a distance between the reference sensing member and the metal sensing member is less than a preset distance, wherein the processor is further configured to acquire a second capacitance variation when the distance between the sensing region and the user changes, so as to correct noise carried in the first capacitance variation according to the second capacitance variation.

9. The electronic device according to claim 1, wherein the test sensor comprises:

a first signal channel, connected to at least one first metal sensing member of the electronic device through a first signal wire; and a second signal channel, connected to at least one second metal sensing member of the electronic device through a second signal wire, wherein an orientation of a sensing region of the at least one second metal sensing member is different from an orientation of a sensing region of the at least one first metal sensing member.

10. The electronic device according to claim 1, wherein the processor is further configured to acquire, according to the first capacitance variation, a distance between the user and the electronic device in a direction perpendicular to the sensing region.

11. A method for radiation power adjustment, implemented by an electronic device, the method being used to adjust a radiation power of a radio frequency circuit in the electronic device, and comprising:

receiving data of at least one signal channel from a test sensor of the electronic device, wherein the data of each of the at least one signal channel comprises a first capacitance variation and first identification information;

determining a radio frequency circuit to be adjusted according to the first identification information, wherein a radiation direction of the radio frequency circuit is the same as an orientation of a sensing region corresponding to the first capacitance variation; and adjusting a radiation power of the radio frequency circuit according to the first capacitance variation, wherein adjusting the radiation power of the radio frequency circuit according to the first capacitance variation comprises:

determining a threshold range of the first capacitance variation; and adjusting the radiation power of the radio frequency circuit according to a mapping relationship between the threshold range and the radiation power.

12. The method according to claim 11, wherein adjusting the radiation power of the radio frequency circuit according to the first capacitance variation comprises:

judging whether the first capacitance variation exceeds a threshold; and reducing the radiation power of the radio frequency circuit when the first capacitance variation exceeds the threshold.

13. The method according to claim 11, further comprising:

determining, according to the first capacitance variation, a distance between a user and a side surface parallel to the sensing region of the electronic device corresponding to the first capacitance variation.

14. The method according to claim 11, further comprising:

receiving data of a reference channel from the test sensor, wherein the data of the reference channel comprises a second capacitance variation and second identification information;

determining data of a signal channel to be corrected according to the second identification information; and correcting the first capacitance variation in the data of the signal channel according to the second capacitance variation.

15. An electronic device, comprising:

a processor; and a memory configured to store instructions executable by the processor, wherein the processor is configured to:
    receive data of at least one signal channel from a test sensor of the electronic device, wherein the data of each of the at least one signal channel comprises a first capacitance variation and first identification information;
    determine a radio frequency circuit to be adjusted according to the first identification information, wherein a radiation direction of the radio frequency circuit is the same as an orientation of a sensing region corresponding to the first capacitance variation; and
    adjust a radiation power of the radio frequency circuit according to the first capacitance variation;

wherein in adjusting the radiation power of the radio frequency circuit according to the first capacitance variation, the processor is further configured to:
    determine a threshold range of the first capacitance variation; and
    adjust the radiation power of the radio frequency circuit according to a mapping relationship between the threshold range and the radiation power.

16. The apparatus according to claim 15, wherein the processor is further configured to:
    judge whether the first capacitance variation exceeds a threshold; and
    reduce the radiation power of the radio frequency circuit when the first capacitance variation exceeds the threshold.

17. The apparatus according to claim 15, wherein the processor is further configured to:
    determine, according to the first capacitance variation, a distance between a user and a side surface parallel to the sensing region of the electronic device corresponding to the first capacitance variation.

\* \* \* \* \*